(12) United States Patent
Bastide et al.

(10) Patent No.: US 11,475,086 B2
(45) Date of Patent: Oct. 18, 2022

(54) USER CONTRIBUTION ENGAGEMENT

(71) Applicant: INTERNATIONAL BUSINESS MACHINES CORPORATION, Armonk, NY (US)

(72) Inventors: Paul R. Bastide, Ashland, MA (US); Fang Lu, Billerica, MA (US); SathyaNarayanan Srinivasan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 17/022,313

(22) Filed: Sep. 16, 2020

(65) Prior Publication Data
US 2022/0083613 A1  Mar. 17, 2022

(51) Int. Cl.
| | | |
|---|---|---|
| *G06F 7/02* | (2006.01) |
| *G06F 16/00* | (2019.01) |
| *G06F 16/9535* | (2019.01) |
| *G06F 16/9536* | (2019.01) |
| *G06F 16/9538* | (2019.01) |
| *G06F 16/951* | (2019.01) |
| *H04L 51/02* | (2022.01) |
| *H04L 51/52* | (2022.01) |

(52) U.S. Cl.
CPC ........ *G06F 16/9535* (2019.01); *G06F 16/951* (2019.01); *G06F 16/9536* (2019.01); *G06F 16/9538* (2019.01); *H04L 51/02* (2013.01); *H04L 51/52* (2022.05)

(58) Field of Classification Search
CPC .............. G06F 16/9535; G06F 16/951; G06F 16/9536; G06F 16/9538; H04L 51/02; H04L 51/32
See application file for complete search history.

(56) References Cited

U.S. PATENT DOCUMENTS

| | | |
|---|---|---|
| 7,167,910 B2 | 1/2007 | Farnham |
| 7,472,110 B2 | 12/2008 | Achlioptas |
| 7,539,697 B1 | 5/2009 | Akella |
| 7,668,957 B2 | 2/2010 | Achlioptas |
| 8,639,756 B2 | 1/2014 | Bostroem |
| 8,744,976 B2 | 6/2014 | Jagadish |
| 9,294,576 B2 | 3/2016 | Lange |
| 9,465,830 B2 | 10/2016 | Wable |
| 9,530,166 B2 | 12/2016 | Taylor |
| 9,660,822 B1 | 5/2017 | Goldman |
| 9,710,447 B2 | 7/2017 | Li |

(Continued)

OTHER PUBLICATIONS

Disclosed Anonymously, "Facebook for Developers Page Feed," https://developers.facebook.com/docs/graph-api/reference/v3.2/page/feed, Printed Jun. 30, 2020, pp. 1-3.

(Continued)

*Primary Examiner* — Bruce M Moser
(74) *Attorney, Agent, or Firm* — Kristofer L. Haggerty

(57) ABSTRACT

A method, a structure, and a computer system for engaging user contributions. The exemplary embodiments may include determining whether a detected message includes a need and, based on determining that the message includes the need, identifying one or more contributions a user can contribute to the need. The exemplary embodiments may further include augmenting a reply message with the one or more contributions.

20 Claims, 5 Drawing Sheets

(56) References Cited

U.S. PATENT DOCUMENTS

| | | | | |
|---|---|---|---|---|
| 2006/0041663 | A1* | 2/2006 | Brown | G06F 16/9535 709/200 |
| 2012/0089681 | A1* | 4/2012 | Chowdhury | H04L 12/6418 709/206 |
| 2012/0310927 | A1* | 12/2012 | Johnson | G06F 16/24578 707/723 |
| 2014/0359439 | A1* | 12/2014 | Lyren | G06F 16/951 707/706 |
| 2016/0117384 | A1 | 4/2016 | Akavaram | |
| 2017/0302613 | A1 | 10/2017 | Imbrie | |
| 2018/0183852 | A1 | 6/2018 | Jackson | |
| 2020/0012639 | A1 | 1/2020 | Liu | |

OTHER PUBLICATIONS

Disclosed Anonymously, "Facebook for Developers Webhook Messenger Platform," Printed Jun. 30, 2020, pp. 1-3.

Disclosed Anonymously, "Facebook for Developers, User Favorite Requests," https://developers.facebook.com/docs/graph-api/reference/user, Printed Jun. 30, 2020, pp. 1-3.

Disclosed Anonymously, "Facebook for Developers, User," https://developers.facebook.com/docs/graph-api/reference/user, Printed Jun. 30, 2020, pp. 1-3.

Disclosed Anonymously, "GNIP APIS," GNIP.com, Printed Jun. 30, 2020, pp. 1-4.

Disclosed Anonymously, "IBM Watson Natural Language Classifier," https://www.ibm.com/watson/services/natural-language-classifier/, Printed Jun. 30, 2020, pp. 1-11.

Disclosed Anonymously, "Push Technology," Wikipedia, Printed Jun. 30, 2020, pp. 1-7.

Disclosed Anonymously, "Social Media Capture, Archiving, and Compliance Solutions," Printed Jun. 30, 2020, pp. 1-10.

Grant, "How to Get the Help You Need," Harvard Business Review, May 1, 2018, p. 143.

Mell et al., "The NIST Definition of Cloud Computing", National Institute of Standards and Technology, Special Publication 800-145, Sep. 2011, pp. 1-7.

* cited by examiner

USER CONTRIBUTION ENGAGEMENT

BACKGROUND

The exemplary embodiments relate generally to social networks, and more particularly to user contribution engagement within social networks.

Online social networks and collaboration tools are connecting people and information in logical and organized ways to share and process information between users. The most common mechanisms of sharing and processing information within a social network are the channel, inbox, text messages, wall, activity stream, timeline and profile. These mechanisms enable one to rapidly share information with others, connect, gather and discuss many things and topics. While the rapid sharing of information enables a user to stay informed and update a network or people, many users remain reluctant to ask for and render assistance.

SUMMARY

The exemplary embodiments disclose a method, a structure, and a computer system for engaging user contribution. The exemplary embodiments may include determining whether a detected message includes a need and, based on determining that the message includes the need, identifying one or more contributions a user can contribute to the need. The exemplary embodiments may further include augmenting a reply message with the one or more contributions.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
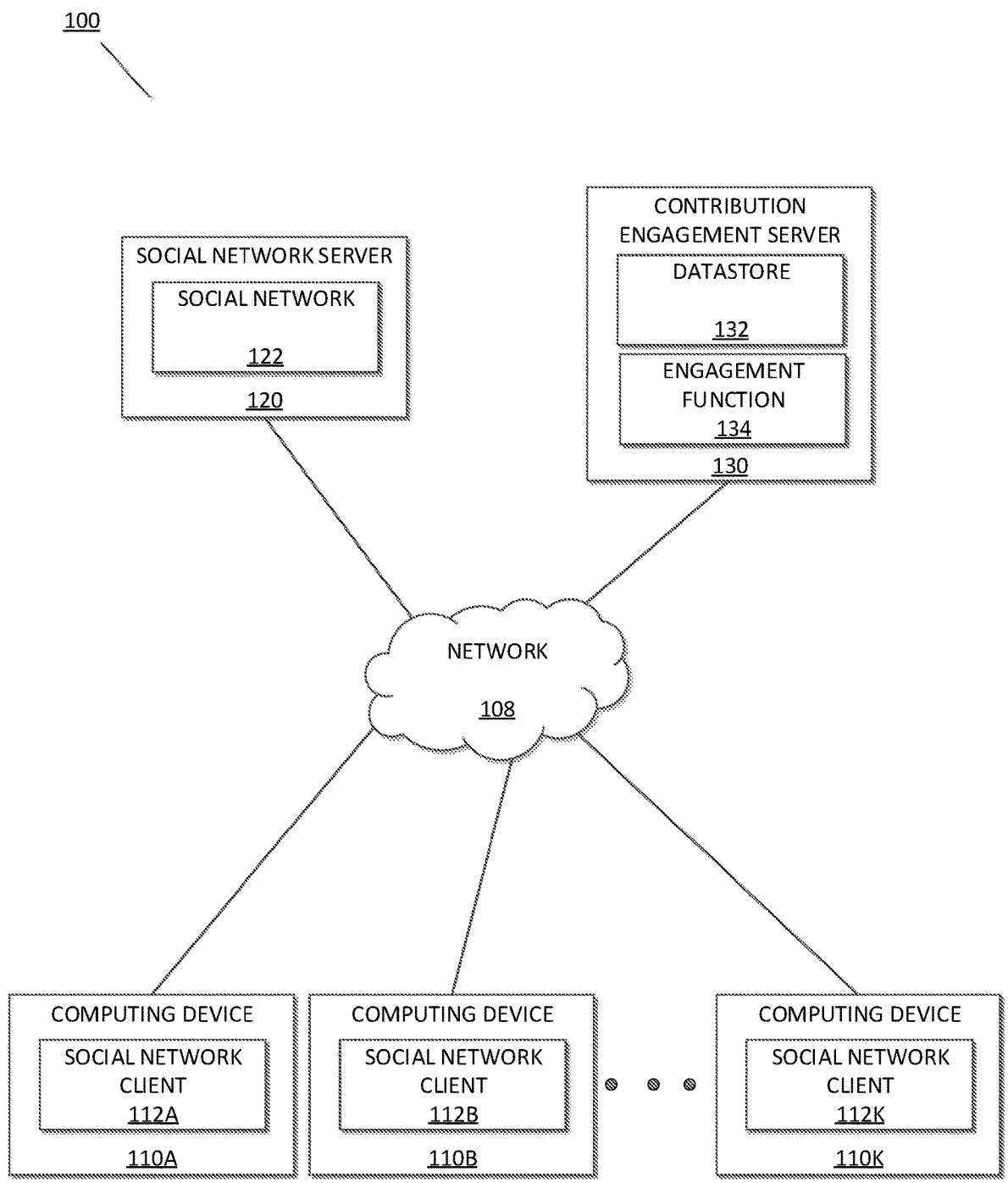
FIG. 1 depicts an exemplary schematic diagram of a contribution engagement system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Online social networks and collaboration tools are connecting people and information in logical and organized ways to share and process information between users. The most common mechanisms of sharing and processing information within a social network are the channel, inbox, text messages, wall, activity stream, timeline and profile. These mechanisms enable one to rapidly share information with others, connect, gather and discuss many things and topics. While the rapid sharing of information enables a user to stay informed and update a network or people, many users remain reluctant to ask for and render assistance. There is a need to show users the contributions they can make and foster supportive conversations.

The invention claimed herein fosters supportive conversations by facilitating user-specific contributions to conversations and engagement with a network of individuals. More specifically, the claimed invention does so by identifying user requests for contributions and distributing the request across multiple users, including nearest neighbors in a network, friends, friends of friends, etc. The advantages of the present invention include identifying conversations to which a user may beneficially contribute and fostering supportive conversations.

FIG. 1 depicts the contribution engagement system 100, in accordance with exemplary embodiments. According to the exemplary embodiments, the contribution engagement system 100 may include computing devices 110A-K, a social network server 120, and a contribution engagement server 130, which all may be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted. In the following detailed description, it is assumed that each of the one or more computing devices 110A-K each correspond to a different user of the social network 122.

In the exemplary embodiments, the network 108 may be a communication channel capable of transferring data between connected devices. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. The network 108 may operate in frequencies including 2.4 GHz and 5 GHz Internet, near-field communication, Z-Wave, Zigbee, etc. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In exemplary embodiments, each of the computing devices 110A-K may include respective social network clients 112A-K, and may each be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of sending and receiving data to and from other computing devices. The computing devices 110A-K are described in greater detail as a hardware implementation with reference to FIG. 3, as part of a cloud implementation with reference to FIG. 4, and/or as utilizing functional abstraction layers for processing with reference to FIG. 5.

The social network clients 112A-K may act as clients in a client-server relationship with the social network server 120, and may be a software and/or hardware application capable of communicating with and providing a user interface for a user to interact with a server and other computing devices via the network 108. Moreover, in the example embodiment, the social network clients 112A-K may be capable of transferring data to and from the computing devices 110A-K via the network 108. In embodiments, the social network clients 112A-K may utilize various wired and wireless connection protocols for data transmission and exchange, including Bluetooth, 2.4 GHz and 5 GHz internet, near-field communication, Z-Wave, Zigbee, etc. The social media clients 112A-K are described in greater detail with respect to FIG. 2-5.

In exemplary embodiments, the social network server 120 includes a social network 122, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of sending and receiving data to and from other computing devices. While the social network server 120 is shown as a single device, in other embodiments, the social network server 120 may be comprised of a cluster or plurality of computing devices, in a modular manner, etc., working together or working independently. The social network server 120 is described in greater detail as a hardware implementation with reference to FIG. 3, as part of a cloud implementation with reference to FIG. 4, and/or as utilizing functional abstraction layers for processing with reference to FIG. 5.

The social network 122 may be a network for connecting one or more users. In embodiments, the social network 122 may include various means for communicating and sharing information, including a channel, inbox, text messaging, wall, activity stream, timeline, profile, etc. The social network 122 may allow users to establish relationships and networks of other users with whom the user associates, e.g., a user may have a network of work colleagues, a network of athletic teammates, and a network of hobby enthusiasts. The social network 122 is described in greater detail with respect to FIG. 2-5.

In exemplary embodiments, the contribution engagement server 130 includes a datastore 132 and an engagement function 134, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of sending and receiving data to and from other computing devices. While the contribution engagement server 130 is shown as a single device, in other embodiments, the contribution engagement server 130 may be comprised of a cluster or plurality of computing devices, in a modular manner, etc., working together or working independently. The contribution engagement server 130 is described in greater detail as a hardware implementation with reference to FIG. 3, as part of a cloud implementation with reference to FIG. 4, and/or as utilizing functional abstraction layers for processing with reference to FIG. 5.

The datastore 132 may be a database of files, folders, etc., for storing information. In embodiments, the datastore 132 may be analytical/atomic, and may detail one or more messages between one or more users of the social network 122. In particular, the datastore 132 may identify the one or more messages based on conversation ID and time. The datastore 132 is described in greater detail with respect to FIG. 2-5.

The engagement function 134 my a software and/or hardware program capable of detecting and archiving a social network message. The engagement function 134 may be further capable of determining whether the message includes a need for action and, based thereon, identifying a topic of the message. The engagement function 134 may be further capable of identifying one or more user contributions to the message, augmenting a reply message with the identified contribution, and promoting the reply message to the user. In exemplary embodiments, the engagement function 134 may be integrated with the social network 122.

Figure 2:
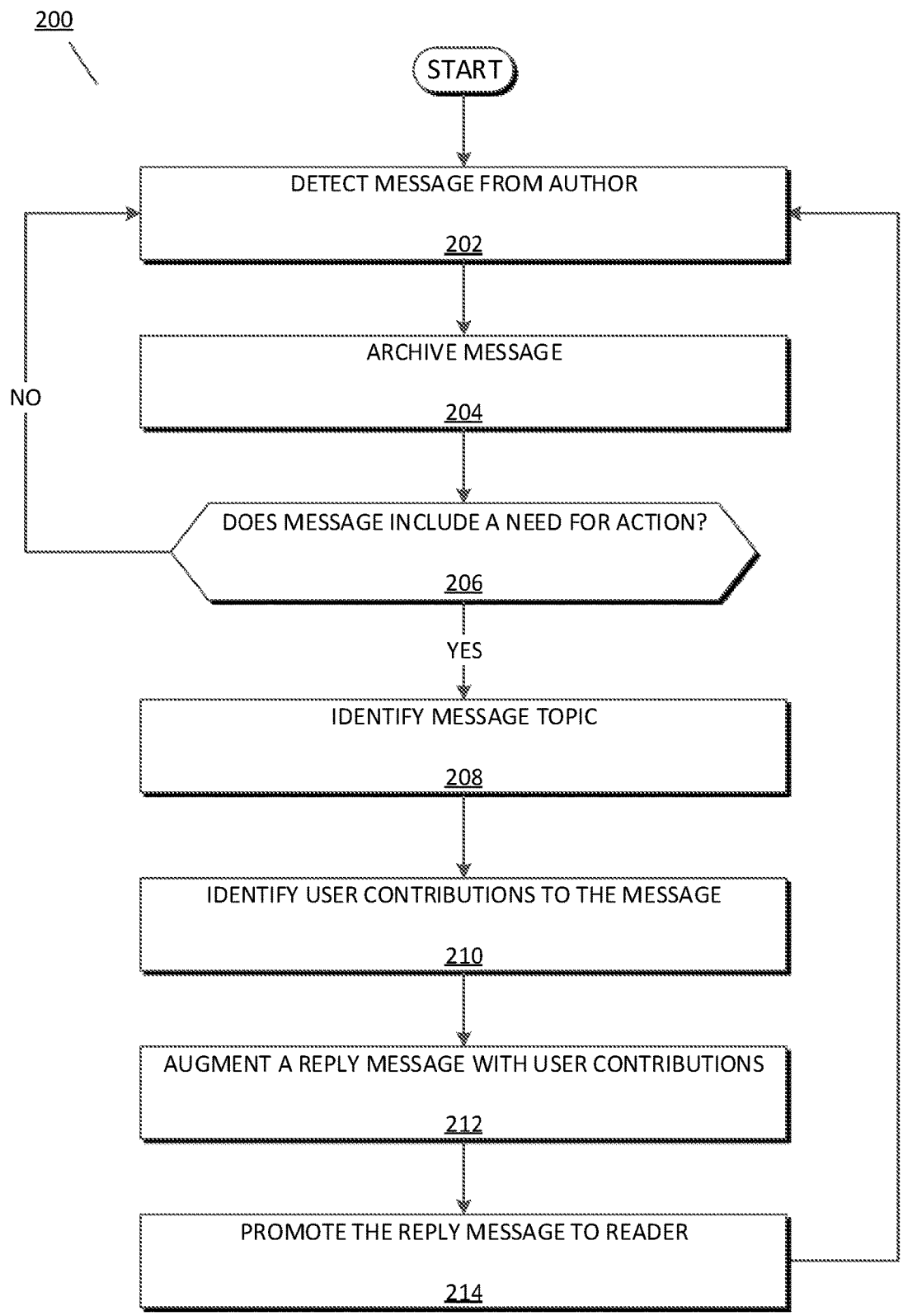
FIG. 2 depicts an exemplary flowchart 200 illustrating the operations of an engagement function 134 of the contribution engagement system 100, in accordance with the exemplary embodiments.

FIG. 2 depicts an exemplary flowchart 200 illustrating the operations of the engagement function 134 of the contribution engagement system 100, in accordance with the exemplary embodiments.

The engagement function 134 may detect and archive a message (step 202). As used herein, a message may be any communication between users of the social network 122, including messages, emails, posts, threads, etc., as well as replies thereto, which may be transmitted by an author user to one or more reader users via the respective contribution engagement clients 120A-K and the network 108. In embodiments, the engagement function 134 may detect a message using one or more techniques, which may be triggered by the engagement function 134, a user, an administrator, etc. In preferred embodiments, the engagement function 134 may implement push message detection where the engagement function 134 receives a stream or batch of messages for a particular topic, user, or group of users instantly. Push message detection allows for stream-based processing of messages that ensures a nearly perfect logical ordering of the messages based on time, and further improves performance due to the scaling being performed at the backend data processing tier, unlike the proceeding two approaches. Alternatively, or in addition, the engagement function 134 may implement pull feed detection which queries messages sent within a time frame or since a last query. For example, a pull feed implementation may retrieve messages from a particular user or for a particular topic every 15 minutes. In further embodiments, the engagement function 134 may implement user interface detection where a command or interceptor captures data on the screen and scrapes the corresponding document object model for the elements of interest. Overall, the engagement function 134 may implement any method or combination of methods for detecting messages between users of the social network 122.

In order to better illustrate the operations of the contribution engagement system 100, reference is now made to an illustrative example wherein the engagement function 134 is configured for push message detection where messages between users of the computing devices 110A-K within the social network 122 are streamed to the engagement function 134 instantly. Here, the engagement function 134 detects a message from author user Frank to reader users Alice and Sam that reads: "I need to change a tire. Where should I start?"

The engagement function 134 may archive the detected messages (step 204). More specifically, the engagement function 134 may archive the data within the datastore 132 analytically/atomically based on conversation-id and time. For example, the engagement function 134 may archive the message using a schema such as:

Message Details {Body, Subject, Metadata}
Topic Concepts/Category [0 . . . *—Concept-1, Concept-2, Concept-3]
Unique Message Identifier—Generated or Extracted from the message]
Conversation Identifier—Generated through membership lists or Extracted from the message.
Access Control—Membership list of the conversation
Owner—The owner/author of a specific message, if the User is unknown the message is marked as UNKOWN. For instance, when a User leaves a company.
Location (GPS, Longitude/Latitude, Region)—used to determine user proximity
Tenant—The assigned company or group, used for sharding the data and landing the data in a controlled data store.
Terminal—Indicating the message was the end of the conversation.
Weights: Views, Participation metrics. The invention also considers reply-marks, read-marks, like/up-vote data to augment the extracted data.

Additionally, for each author and reader related to each message, the engagement function 134 may additionally extract:

Person References—To, CC, BCC and textual references to person identifiers
Message and Conversation Identifiers—To, CC, BCC, Conversation-ID, Thread ID
Body, Subject—Which are parsed into Entities The engagement function 134 may further extract information from a user profile, e.g., name, gender, age, location, hobbies, likes, dislikes, etc. In order to implement data privacy, the engagement function 134 may establish opt-in and -out parameters for data inclusion into the datastore 132, which may label the data as private or public. Moreover, the engagement function 134 may periodically update the information stored in the datastore 132 using similar methods to those described above.

With reference again to the illustrative example wherein the engagement function 134 detects the message from author user Frank to reader users Alice and Sam, the engagement function 134 archives the message data as well as user data corresponding to Frank, Alice, and Sam. The archived message may be stored in the datastore 132 as, for example:

```
{ "message" :
"I need to change a tire. Where should I start?",
"sender": Frank
"user" : {
   "location": Ashton
   "temperature": 87
   "first name": Frank
   "last name": User1
}
}
```

The engagement function 134 may determine whether the detected and archived message includes a need for action (decision 206). In embodiments, the engagement function 134 may determine whether the message includes a need for action by analysing both the verb and object in the statement. In particular, the engagement function 134 applies both text analysis and sentiment analysis to determine different types of help a user may require in their message. The text analysis may associate predefined keywords and/or phrases with a need, e.g., "need to . . . ", "going to . . . ", "wherein can I . . . ", etc. The analysis may use modality feedback based on emojis or subsequent refinement in conversation messages which indicate a need for action. In embodiments, the engagement function 134 may further implement techniques such as keyword searching, template matching, natural language processing, syntax analysis, etc. After determining whether the message includes a need, the contribution engager 143 may cache this determination in the datastore 132 such that the determination is made beforehand for other readers of the message.

Returning to the illustrative example introduced above, the engagement function 134 determines that the message includes a need for action based on template matching the phrase "where can I" within the message.

If the engagement function 134 identifies a message as including a need for action (decision 206, "YES" branch), the engagement function 134 identifies a topic of the message (step 208). In embodiments, the engagement function 134 identifies one or more topics of the message using techniques such as topic modeling. The engagement function 134 may further mark the message as indicating that action is needed.

With reference to the previously introduced example, the engagement function 134 identifies the topic of the message as 'tire'.

The engagement function 134 may identify one or more user contributions to the message (step 210). In embodiments, the engagement function 134 identifies one or more user contributions to the message by searching for existing tags and posts from the user within the datastore 132 that are related to the verb and subject parsed from the message. For example, the engagement function 134 may search user tags and posts for activity that includes a location or activity parsed from the message. The invention may further conduct a mapping based on the necessary actions required through the attributes of the verb and subjects of the message. In other embodiments, the engagement functions 134 may implement probabilistic matching, Jaccard distance, etc., to identify relationships between the searched item and the existing tags and posts. Overall, the engagement functions 134 may use any metric to associate the affinity and activity of the users. Moreover, the engagement function 134 may similarly search the tags and posts of other users within the user's network, as well.

Continuing the previously introduced example, the engagement function 134 searches the networks of Alice and Sam within the datastore 132 to identify tags and posts relating to the topic "tire" to identify the messages:
MSG1—Topic—Subject: change a tire, Start
Topic: Tire|Author: Beverly (Alice's Network)|Frequency: 20 times
Topic: Change a Tire|Author: Sam (Alice's Network) |Frequency: 100 times The engagement function 134 may augment a reply message with the identified user contributions (step 212). In embodiments, the engagement function 134 augments the text message (appending or prepending) and may include an icon to mouse over and show summary details on connections, e.g., a history of correlated messages or actions, a probability that the user can contribute, etc. The engagement function 134 may add user icon data to attract the user or show a summary of the actions or the statistics that he can use or add, e.g., threads, articles, multimedia such as audio, photo, video, etc.

Furthering the previously introduced example, the contribution engager 143 amends the message for Alice and Sam to recite, respectively:
"I need to change a tire. Where should I start?"
Alice—"You can connect Alice to Sam"
"I need to change a tire. Where should I start?"
Sam—"You speak ten times more frequently than average."
"You are the most familiar with Tire's in Franks' Network."

The engagement function 134 may promote the reply message to the reader (step 214). The engagement function 134 may make the augmented message more noticeable (e.g. a higher weight and view in the newsfeed), as well as rank and recommend the candidates that can help complete the tasks. The contribution engager 143 may display the recommended candidates to the user, prompt the user to send a message, and/or transmit an alert to the candidates that can help complete the tasks through both visual and audio cues.

Concluding the aforementioned example, the contribution engager 143 emphasizes the message to Sam by moving it to the top of their respective news feeds.

Figure 3:
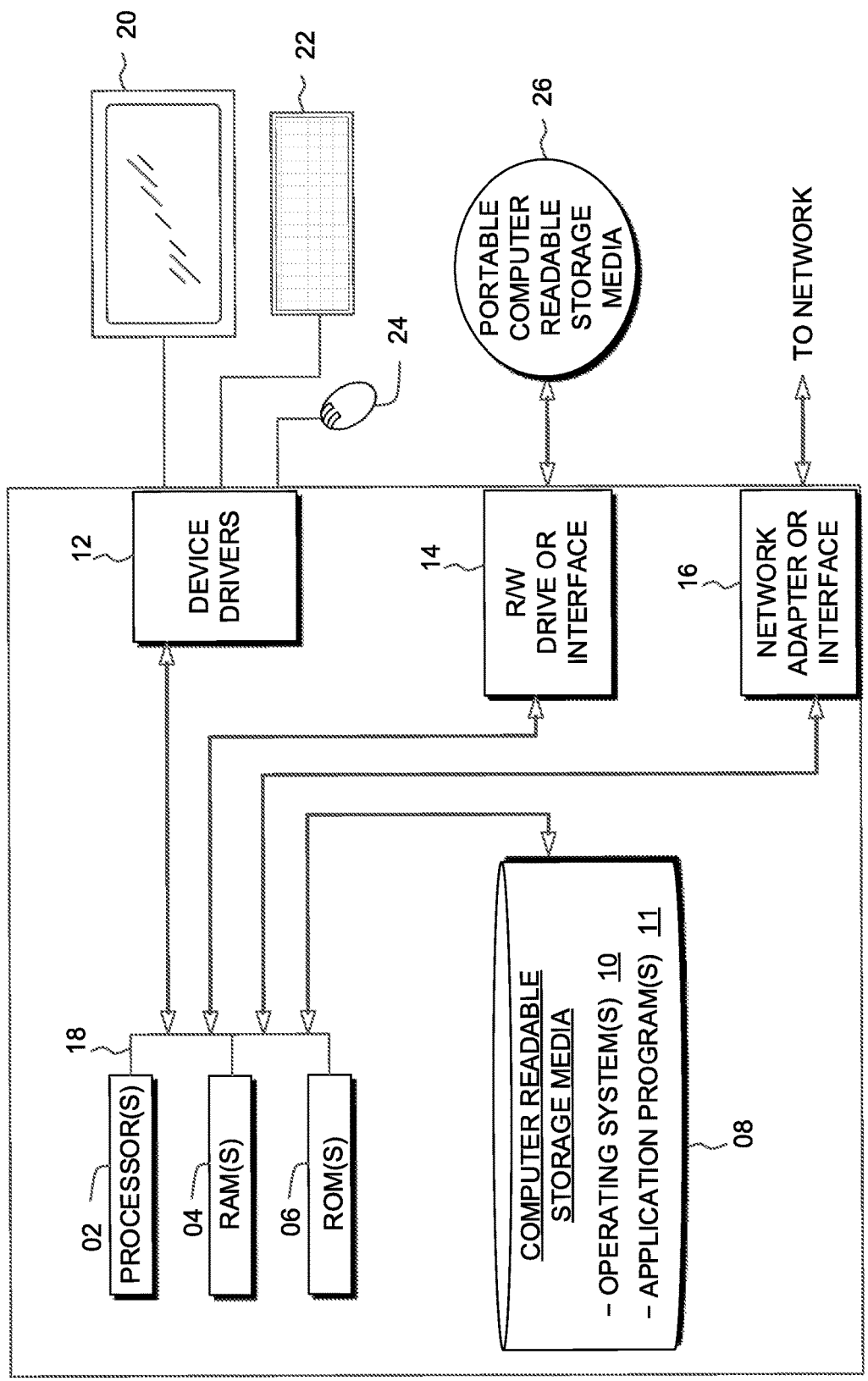
FIG. 3 depicts an exemplary block diagram depicting the hardware components of the contribution engagement system 100 of FIG. 1, in accordance with the exemplary embodiments.

FIG. 3 depicts a block diagram of devices used within the contribution engagement system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
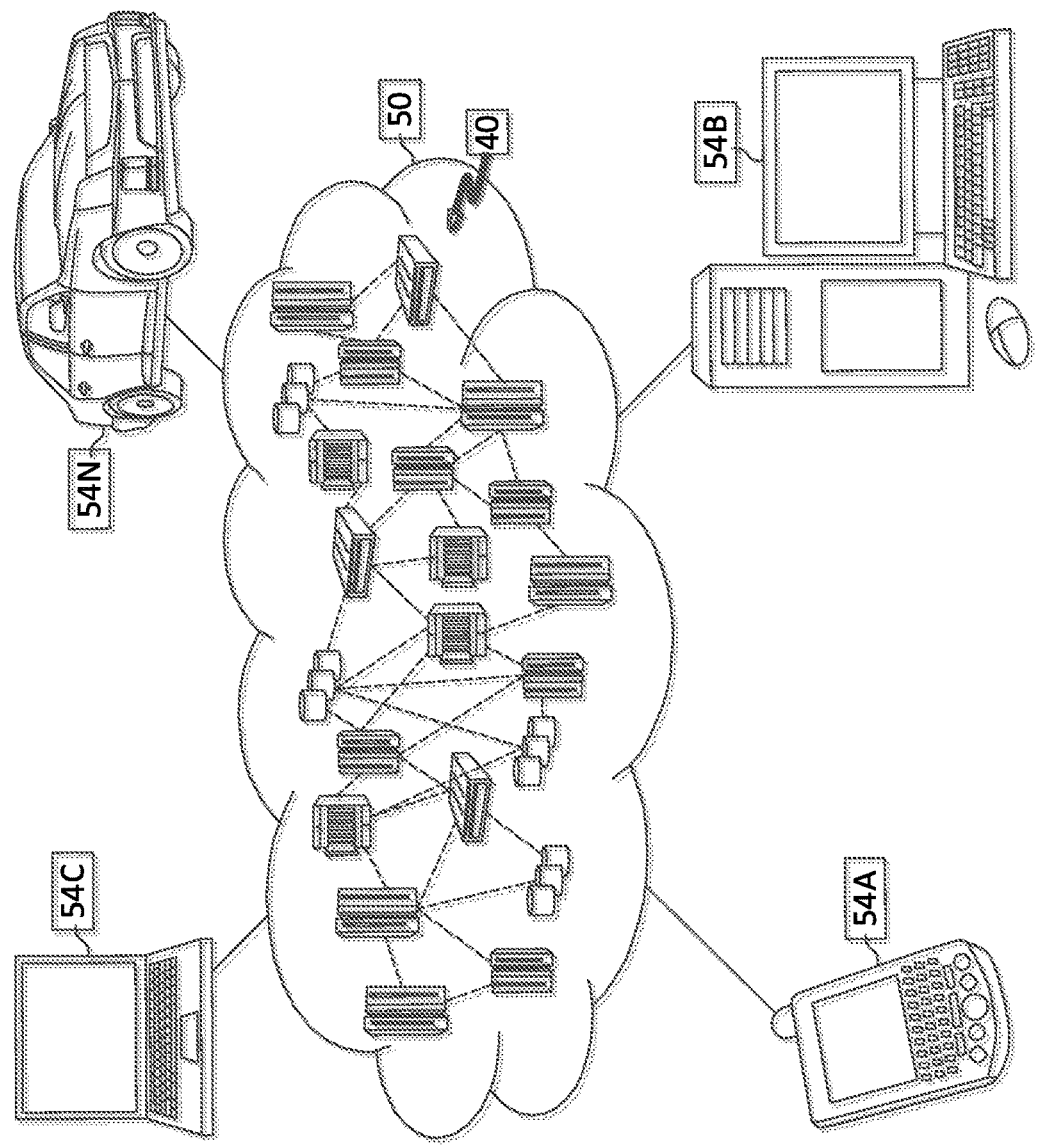
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
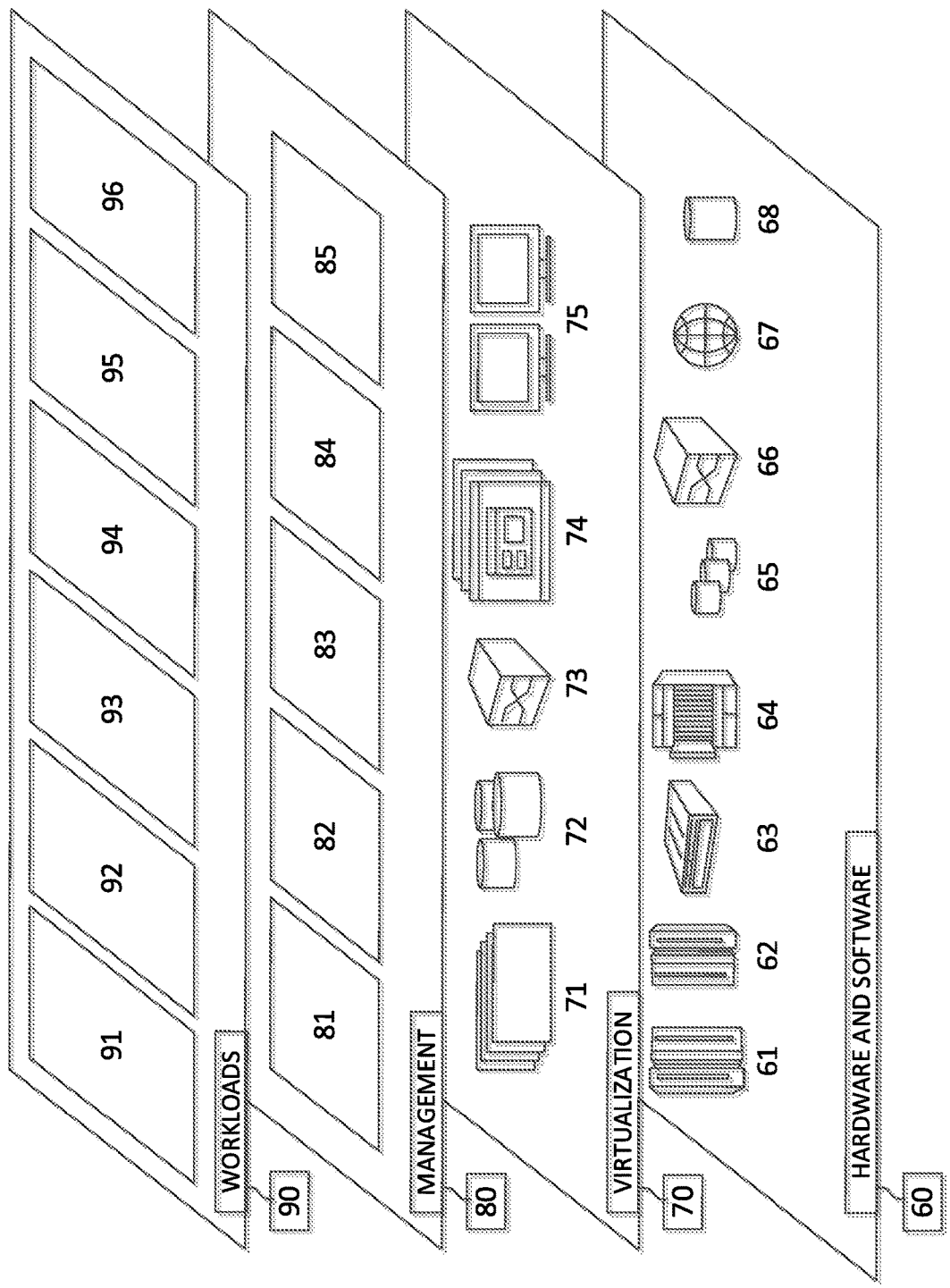
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfilment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and contribution engagement processing 96.

The exemplary embodiments may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for engaging user contributions, the method comprising:
   determining whether a detected message includes a need;
   identifying a location of an author of the message via GPS;
   based on determining that the message includes the need, identifying one or more contributions a user can contribute to the need, wherein the user is within a geographic proximity of the location and is not a network connection of the author; and
   augmenting the message to inquire whether a mutual network connection of the author and the user can introduce the author and the user.

2. The method of claim 1, further comprising:
   archiving the message within a datastore.

3. The method of claim 2, wherein the identifying the one or more contributions the user can contribute to the need is based on searching the datastore.

4. The method of claim 3, further comprising:
   identifying a topic of the message; and
   wherein the identifying the one or more contributions the user can contribute to the need is based on matching the topic of the message to a topic of a previous message stored in the datastore.

5. The method of claim 1, wherein the identifying the one or more contributions the user can contribute to the need is based on a distance metric between the message and one or more previous messages stored within the datastore.

6. The method of claim 1, wherein determining whether the message includes the need is based on at least one of keyword searching and template matching.

7. The method of claim 1, further comprising:
   emphasizing the message to the mutual network connection.

8. A computer program product for engaging user contributions, the computer program product comprising:
   one or more non-transitory computer-readable storage media and program instructions stored on the one or more non-transitory computer-readable storage media capable of performing a method, the method comprising:
   determining whether a detected message includes a need;
   identifying a location of an author of the message via GPS;
   based on determining that the message includes the need, identifying one or more contributions a user can contribute to the need, wherein the user is within a geographic proximity of the location and is not a network connection of the author; and
   augmenting the message to inquire whether a mutual network connection of the author and the user can introduce the author and the user.

9. The computer program product of claim 8, further comprising:
   archiving the message within a datastore.

10. The computer program product of claim 9, wherein the identifying the one or more contributions the user can contribute to the need is based on searching the datastore.

11. The computer program product of claim 10, further comprising:
    identifying a topic of the message; and
    wherein the identifying the one or more contributions the user can contribute to the need is based on matching the topic of the message to a topic of a previous message stored in the datastore.

12. The computer program product of claim 8, wherein the identifying the one or more contributions the user can contribute to the need is based on a distance metric between the message and one or more previous messages stored within the datastore.

13. The computer program product of claim 8, wherein determining whether the message includes the need is based on at least one of keyword searching and template matching.

14. The computer program product of claim 8, further comprising:
    emphasizing the message to the mutual network connection.

15. A computer system for engaging user contributions, the system comprising:
    one or more computer processors, one or more computer-readable storage media, and program instructions stored on the one or more of the computer-readable storage media for execution a method by at least one of the one or more processors, the method comprising:
    determining whether a detected message includes a need;
    identifying a location of an author of the message via GPS;
    based on determining that the message includes the need, identifying one or more contributions a user can contribute to the need, wherein the user is within a geographic proximity of the location and is not a network connection of the author; and
    augmenting the message to inquire whether a mutual network connection of the author and the user can introduce the author and the user.

16. The computer system of claim 15, further comprising: archiving the message within a datastore.

17. The computer system of claim 16, wherein the identifying the one or more contributions the user can contribute to the need is based on searching the datastore.

18. The computer system of claim 17, further comprising:
identifying a topic of the message; and
wherein the identifying the one or more contributions the user can contribute to the need is based on matching the topic of the message to a topic of a previous message stored in the datastore.

19. The computer system of claim 15, wherein the identifying the one or more contributions the user can contribute to the need is based on a distance metric between the message and one or more previous messages stored within the datastore.

20. The computer system of claim 15, wherein determining whether the message includes the need is based on at least one of keyword searching and template matching.

* * * * *